United States Patent [19]

Jang

[11] Patent Number: 5,504,539
[45] Date of Patent: Apr. 2, 1996

[54] CIRCUIT FOR MODULATING VERTICAL POSITIONS OF A PICTURE IN A WIDE SCREEN TELEVISION

[75] Inventor: Seok-Ho Jang, Seoul, Rep. of Korea

[73] Assignee: Goldstar Co., Ltd., Seoul, Rep. of Korea

[21] Appl. No.: 335,365

[22] Filed: Nov. 3, 1994

[30] Foreign Application Priority Data

Nov. 3, 1993 [KR] Rep. of Korea ............................. 23209

[51] Int. Cl.$^6$ .................................. H04N 3/22; H04N 3/26
[52] U.S. Cl. ........................... 348/806; 348/811; 315/403; 315/371; 315/397
[58] Field of Search ....................... 348/806, 510, 348/511, 529, 446, 556, 793, 811; 315/364, 408, 403, 371, 397; H04N 3/22, 3/26

[56] References Cited

U.S. PATENT DOCUMENTS

| | | | |
|---|---|---|---|
| 3,705,328 | 12/1972 | Torok | 315/403 |
| 4,314,184 | 2/1982 | Ryan | 315/403 |
| 4,547,708 | 10/1985 | Haferl | 315/371 |
| 4,686,430 | 8/1987 | Jennings, Jr. | 315/371 |
| 5,010,280 | 4/1991 | Ogino et al. | 315/403 |
| 5,260,628 | 11/1993 | Kawaberi et al. | 315/371 |

Primary Examiner—James J. Groody
Assistant Examiner—Nina A. West
Attorney, Agent, or Firm—Spencer & Frank

[57] ABSTRACT

This invention relates to a circuit for solving a vertical interlace phenomenon generated by the instability of servo control when a mode of VCR operation is fast or still, comprising a vertical pulse delay 101 for delaying a vertical pulse inputted from a vertical and horizontal oscillator 100 for the time of a certain horizontal lines, a vertical driving part which transforms the vertical pulse delayed from the vertical pulse delay 101 into a vertical a tooth wave pulse, and amends the transformed vertical a tooth wave pulse according to the vertical position signal inputted to be made relayed as a feedback, a vertical deflection amplifying part for amplifying the amended a tooth wave pulse inputted from the vertical driving part 102, a vertical position detecting part 105 for detecting a vertical position of a picture from the signal inputted from the vertical deflection amplifying part 103 through a vertical deflection coil 104, a Micom 106 for controlling an operation of the vertical pulse delay 101 and the vertical driving part 102, and a feedback of the signal inputted from the vertical position detecting part 105 and a vertical position control part 107 for controlling a vertical position variableness of a picture by controlling a signal being made a feedback from the vertical position detecting part according to control signal of the Micom.

2 Claims, 2 Drawing Sheets

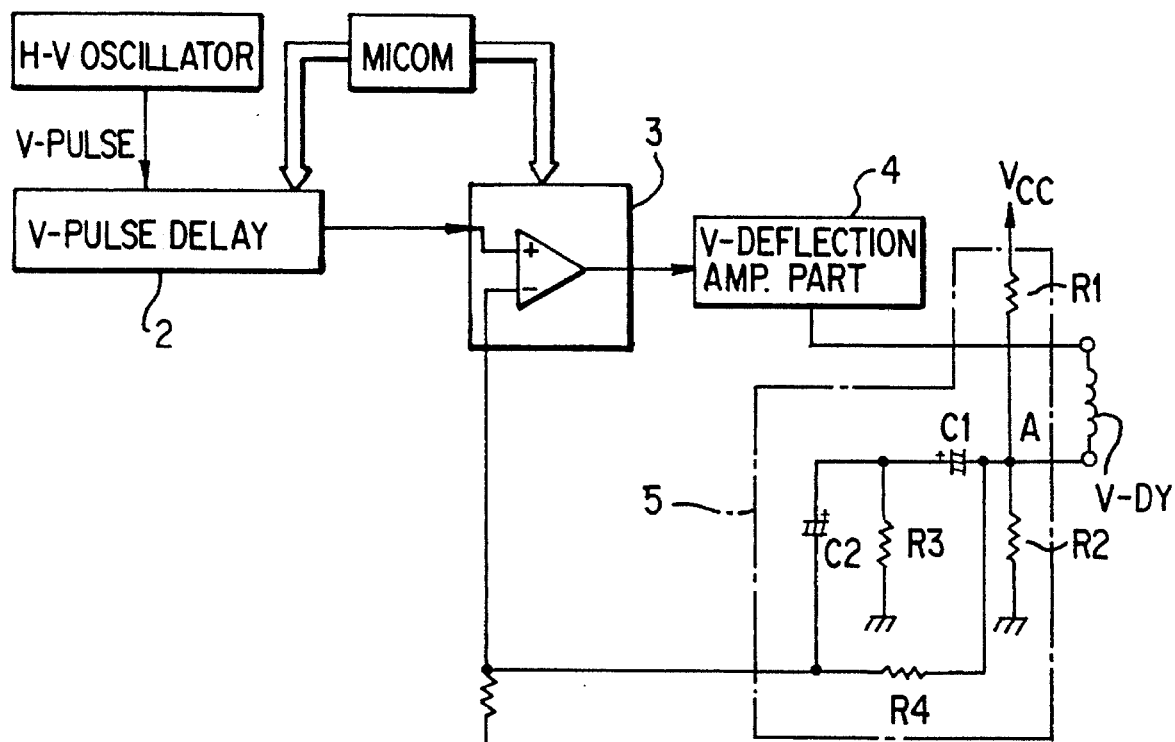
FIG. 1
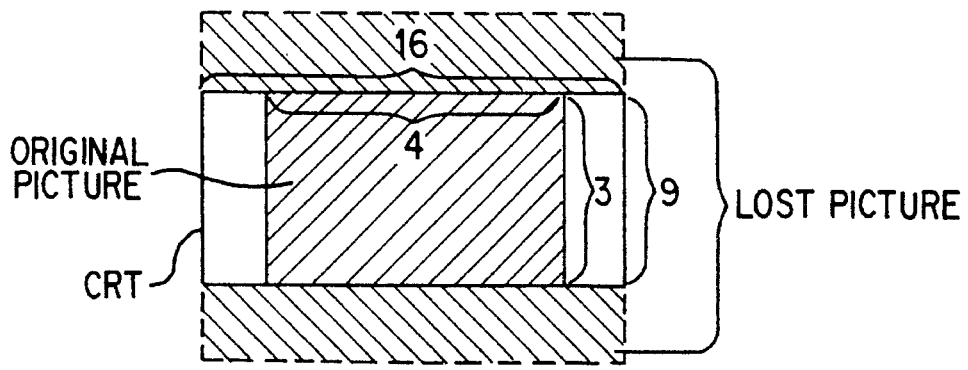
FIG. 2
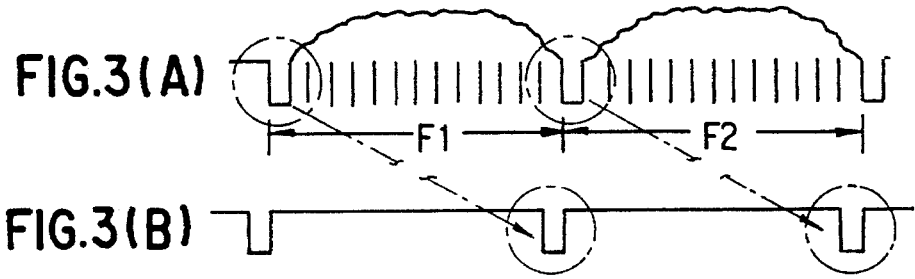
FIG. 3(A)
FIG. 3(B)

CIRCUIT FOR MODULATING VERTICAL POSITIONS OF A PICTURE IN A WIDE SCREEN TELEVISION

FIELD OF THE INVENTION

This invention relates to a circuit for modulating a vertical position of a picture in a wide screen television, and more particularly to a circuit for correcting a vertical interlace phenomenon generated by instability of servo control during the VCR operation, especially in the fast and still modes.

BACKGROUND OF THE INVENTION

Generally speaking, it needs 33% expansion of a picture to the vertical and horizontal direction of screen to fill a picture having vertical and horizontal ratio of 16:9 on the cathode ray tube without a variation in the ratio when the vertical and horizontal ratio of a picture is 4:3. This is called with zoom mode, so as to materialize this zoom mode, and needs a circuit that is able to vary a vertical position of a picture.

Referring to the FIG. 2, this is a drawing for showing a state of a picture on zoom mode. As shown in the upper and lower portions of FIG. 2, in absence of the the circuit for varying a vertical portion of a picture, the picture positioned to the vertical direction is lost.

FIG. 1 is a conventional circuit diagram which is able to materialize the zoom mode for solving this problem.

This circuit for varying a vertical position of a picture comprises a horizontal and vertical oscillator part 1 for detecting a vertical and horizontal synchronization signals, and outputting a horizontal and vertical pulse from an inputted video signals, a vertical pulse delay part 2 for delaying the vertical pulse outputted from said the horizontal and vertical oscillator part 1 for the time of 265±n-lines, a vertical driving circuit part 3 which makes a voltage amplification, a linearity amendment and a amplitude adjustment of saw tooth wave pulse according to a delayed vertical pulse and a vertical position signal, a vertical deflection amplification part 4 for outputting the amplified pulse to a vertical deflection coil (hereinafter referred to as V-DY) after amplifying a vertical a tooth pulse inputted from the vertical driving circuit part 3. A vertical position detector 5 for detecting a vertical position of a picture and providing a feedback for the detected signal to the vertical driving circuit part 3. A Micom 6 for controlling the circuit including the vertical pulse delay part 2 and the vertical driving circuit part 4 etc.

As shown in the FIGS. 1 and 2, the horizontal and vertical oscillator part 1 detects a horizontal and a vertical synchronizing signals inputted from an external video signal, thereby outputs the detected vertical synchronizing signals to the vertical pulse delay part 2. The vertical pulse delay part 2 delays the vertical pulse inputted from the horizontal and vertical oscillator 1 for the time of 262.5±n-lines according to the control of the Micom 6 and inputs the delayed vertical pulse to the vertical driving circuit part 3.

The operation of the present invention will be described, with references to FIGS. 1 and 2.

Here, when the vertical pulse delay part 2 delays the vertical pulse being inputted for the time of 262.5+n, since a vertical synchronization of output video signal is delayed for the time of n-lines with respect to the input video signal, a picture to be displayed on the screen is raised by the time of n-lines in the vertical direction with respect to the normal position.

In contrast, when the vertical pulse delay part 2 delays the vertical pulse being inputted for the time of 262.5−n, since the vertical synchronization of output video signal becomes faster by the time of 262.5−n lines than the input video signal, a picture to be displayed on the screen is dropped down by the time of n-lines in the vertical direction with respect to the normal position. The vertical driving circuit 3 which receives the delayed vertical pulse outputted from the vertical pulse delay part 2 as above two cases, transforms the vertical pulse into a vertical saw tooth wave and inputs it to the vertical deflection amplification part 4. The vertical deflection amplification part 4 amplifies the inputted vertical a tooth wave pulse and transmits the amplified vertical a tooth wave pulse to the V-DY.

At this time, to adjust the vertical center point, a constant vertical center point direct voltage which is divided by the resistances R1, R2 in the vertical position detection part 5, is applied to the point A, and the voltage flowing through the V-DY with alternate current (hereinafter referred to as "AC") component is made a feedback to the vertical driving circuit 3 through condenser C1, resistance R3, condenser C2 in order.

The vertical driving circuit part 3 which receives a voltage with AC component being made a feedback from said the vertical position detecting part 5 through a negative terminal (−), makes an amendment of a vertical linearity, S-type or parabola.

In addition, the vertical center point voltage which is divided by the resistors R1, R2 in said the vertical position detecting part 5, is made to feedback to the vertical driving circuit part 3.

The vertical driving circuit part 3 which receives the vertical center point voltage from a feedback, amends a vertical position of a picture. However, this conventional circuit for varying a vertical position of a picture has a problem that a difference in the number of horizontal lines per each field is generated by a few lines in contrast with a standard signal.

Accordingly, when this conventional circuit generates a quasi vertical synchronizing signal delaying a signal for the time of 262.5±n-lines as shown in FIG. 3B from the video signal in which a difference in the number of horizontal lines per each field occurs as shown in FIG. 3A, this circuit has a problem of interlace phenomenon that a picture vibrates in the vertical direction because of a difference in the number of lines between the virtual video signal and the field (F2 in FIG. 3A) which becomes a reference of the quasi vertical synchronizing signal.

SUMMARY OF THE INVENTION

The object of the present invention is to provide a circuit for varying a vertical position of a picture in wide screen television for preventing a vertical interlace phenomenon in which a picture vibrates in a vertical direction.

This and other objects can be achieved by a circuit for varying a vertical position of a picture in wide screen television comprising a vertical pulse delay means 101 for delaying a vertical pulse outputted from a vertical and horizontal oscillator means 100 for the time of a certain horizontal lines. A vertical driving means 102 which transforms the vertical pulses delayed from the vertical pulse delay means into a vertical a tooth wave pulse, and amends the transformed vertical a tooth wave pulse inputted to be made a feedback according to the vertical position signal. A vertical deflection amplifying means 103 for amplifying the amended a tooth wave pulse inputted from said the vertical driving means, A vertical position detecting means 105 for detecting a vertical position of a picture from the signal inputted from the vertical deflection amplifying means through a vertical deflection coil. A Micom 106 for controlling an operation of the vertical pulse delay means 101 and the vertical driving means, 106 and a feedback of the signal inputted from the vertical position detecting means. A vertical position controlling means 107 for controlling a vertical position variable of a picture by controlling a signal generated a feedback from said the vertical position detecting means according to control signal of said the Micom.

BRIEF DESCRIPTION OF THE DRAWINGS

FIG. 1 is a block diagram showing a circuit for varying a vertical position of a picture in wide screen television in accordance with conventional art.

FIG. 2 is a view for describing a state of a picture on the screen in zoom mode in accordance with a conventional art.

FIG. 3 is a wave diagram describing an interlace phenomenon being occurred in a conventional circuit for varying a vertical position of a picture.

DETAILED DESCRIPTION OF THE INVENTION

Figure 4:
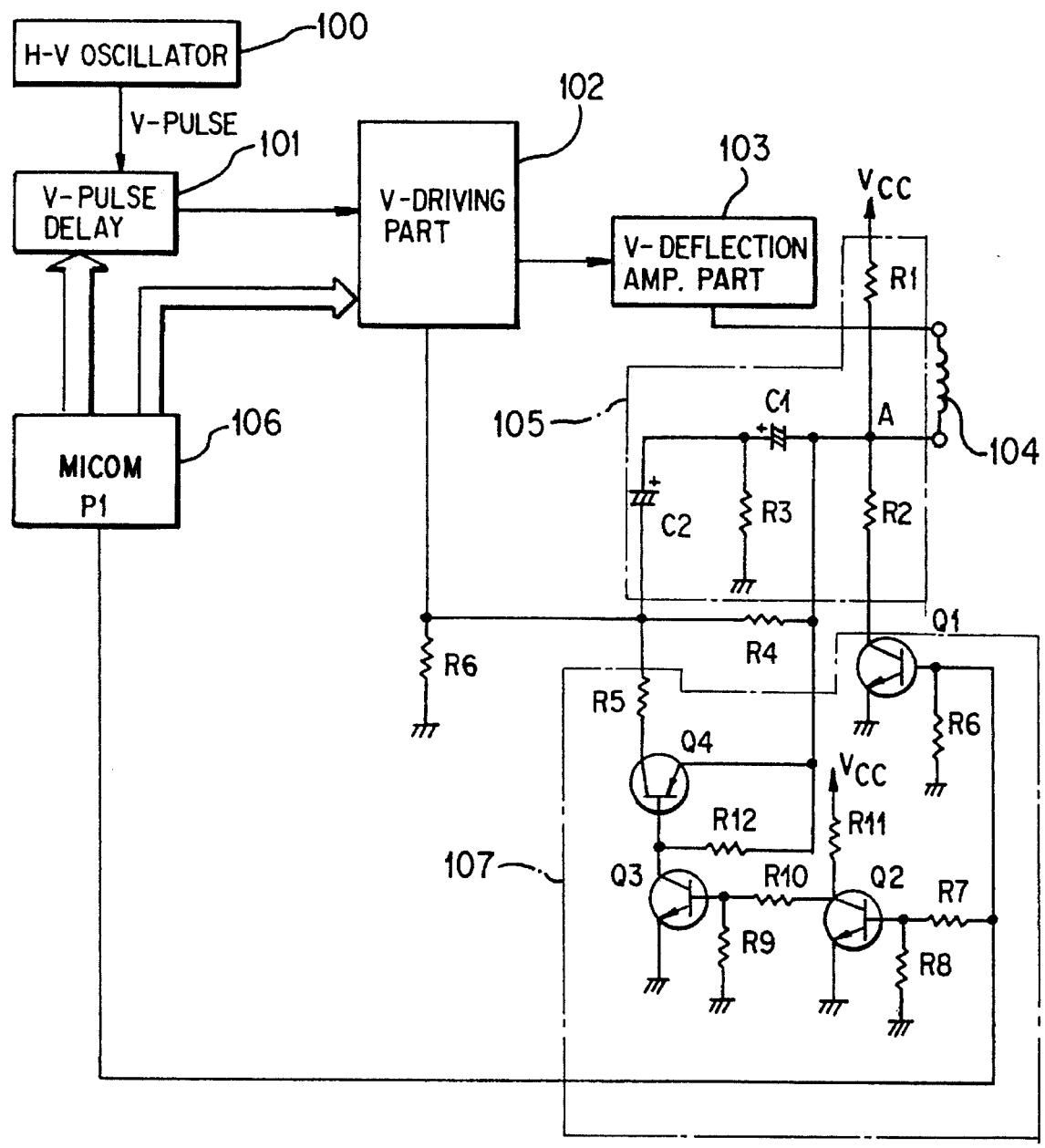
FIG. 4 is a block diagram showing a circuit for varying a vertical position of a picture in wide screen television in accordance with the present invention.

FIG. 4 is a block diagram describing a circuit for varying a vertical position of a picture in wide screen televisions in accordance with the present invention. As shown, the circuit comprises a horizontal and vertical oscillator 100 for outputting separately the pulses of a horizontal and a vertical synchronizing signals which are detected from the horizontal and vertical oscillator 100, a vertical pulse delay part 101 for delaying the vertical pulse outputted from the horizontal and vertical oscillator part 100, a vertical driving part 102 which transforms the vertical pulse obtained from the vertical pulse delay part 101 into a vertical saw tooth wave pulse, and further amends the transformed vertical a tooth wave pulse according to a vertical position signal. The vertical position signal is inputted to a feedback, and the amended a tooth wave pulse. A vertical deflection amplifier 103 which amplifies the a tooth wave pulse from the vertical driving location detecting part 105 which detects the vertical position of a picture according to a flowing current through a vertical coil 104 and makes a feedback the detected position signal to said the vertical driving part 102. A micom 106 which controls all operations of the circuit including the vertical pulse delay part 101 and the vertical driving part 102, and further generates a vertical feedback control signal inputted from the Micom 106.

The horizontal and vertical oscillator part 100 which is receiving a external video signal, and outputs the vertical system pulse for the time of n-horizontal lines according to the control signal of the Micom 106.

When the vertical pulse is delayed for the time of n-horizontal lines, the synchronizing signal of it is n-horizontal lines late for the received video signal. A picture being displayed on the screen increases by n-horizontal lines to the vertical direction in contrast with the normal location. The vertical pulse delayed for the time of n-horizontal lines is inputted to the vertical driving part 102 and is transformed into the vertical sew tooth wave pulse. The vertical driving part 102 outputs the transformed vertical a tooth wave pulse to the vertical deflection amplification part 103.

The vertical deflection amplifier 103 amplifies the relayed vertical a tooth wave pulses and relays the amplified vertical a tooth wave pulse to the V-DY, an electron beam is projected on the screen.

At this stage, to adjust a vertical central point of a picture on the screen, a constant vertical direct voltage which is divided by the resistances R1, R2 in the vertical location detecting part 105 is applied to the point A. The flowing current through the V-DY with AC component is feedback to the vertical driver part 102 through first a condenser C1, next through a resistance R3 and finally through condenser C2.

At this time, Micom 106 outputs the vertical feedback signal with high level in any mode except for the zoom mode.

The high signal of vertical feedback signal is applied to the base terminals of the switching elements Q1,Q2 in the vertical position control part, so as to turn on switching elements Q1, Q2. The switching element Q3 turns off because its base voltage is lowered corresponding to the turning on of said switching element Q2, whereas, the switching element Q4 turns off because its base voltage becomes higher. In addition, according to turning on of the switching element Q1, the vertical center point voltage is decided by the voltage value which the voltage Vcc is divided by the resistance ratio of resistors R1, R2.

Moreover, the feedback gain is decided by the resistance of the resistor R4, when the switching element Q4 turns off. The decided feedback gain is relayed as a feedback to the vertical driver 102.

On the other hand, when in zoom mode, Micom 106 outputs a vertical feedback control signal with low levels to the vertical location control part 107.

The vertical feedback control signal with low level is applied to each base terminals of the switching elements Q1, Q2 and turns said the switching elements Q1, and Q2 off.

When the switching element Q2 is turned off, a high level voltage being divided by resistors R10, R9, is applied to base terminal of the switching element Q3 and thereby said the switching element Q3 is turned on. When the switching element Q3 is turned on, the switching element Q4 is turned off because its base voltage is lowered.

Moreover, the vertical center point voltage is increased, according as the switching element Q1 is turned off. The feedback gain is decided by the voltage which is divided by resistors R1, R2, and is relayed as a feedback to the vertical driving part 102.

When the resistance value of resistor R5 is designated as a sufficiently small value in contrast with the resistance value of the resistor R4, a feedback resistance value is lowered and accordingly a total feedback gain is also lowered.

That is, the center point voltage being made a feedback to OP amp outputting a vertical sew tooth wave pulse, is increased and the feedback gain of OP amp is decreased. Accordingly, DC voltage outputted from the vertical driving part 102 is lowered and the vertical location of a picture being displayed on the screen descends from the normal vertical location of the picture.

Therefore, the predescribed vertical pulse delay part 101 can raise the descended picture during the zoom mode by controlling n-horizontal lines.

Accordingly, the present invention can prevent a interlace phenomenon being occurred in a vertical position control of 262.5±n lines.

As described in detail above, the present invention can solve a problem of a vertical interlace phenomenon generated by instability of servo control when the operation mode in VCR is fast or still and the operation mode in wide screen television is zoom by simple control descending the vertical position of a picture and raising to delay it for the time of n-horizontal lines.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A circuit for varying a vertical position of a picture in wide screen television including: vertical position varying means comprises a vertical deflection coil deflecting an electron beam in a vertical direction according to a tooth wave pulse inputted from a vertical deflection amplifying means, a vertical position detecting means for detecting a vertical position of a picture according to current flowing through said vertical deflection coil and making a feedback the detected signal to said vertical driving means and a vertical position control means for feedback from said vertical position detecting means according to the vertical feedback control signal obtained from the Micom.

2. A circuit according to claim 1, wherein the vertical position control means comprises a first switching member for controlling a vertical center point voltage according to the vertical feedback control signal inputted from the Micom and second to fourth switching members for controlling a feedback gain by varying the controlled vertical center point voltage.

* * * * *